United States Patent
Weston

(10) Patent No.: US 6,237,778 B1
(45) Date of Patent: May 29, 2001

(54) AGRICULTURAL SEPARATING DEVICE AND AGRICULTURAL SEPARATOR

(75) Inventor: David Booth Weston, Boston (GB)

(73) Assignee: Richard Pearson Limited (GB)

( * ) Notice: Subject to any disclaimer, the term of this patent is extended or adjusted under 35 U.S.C. 154(b) by 0 days.

(21) Appl. No.: 09/402,307

(22) PCT Filed: Apr. 2, 1998

(86) PCT No.: PCT/GB98/00973

§ 371 Date: Dec. 22, 1999

§ 102(e) Date: Dec. 22, 1999

(87) PCT Pub. No.: WO98/43471

PCT Pub. Date: Oct. 8, 1998

(30) Foreign Application Priority Data

Apr. 3, 1997 (GB) .................................................. 9706737

(51) Int. Cl.⁷ .................................................. B07B 13/05
(52) U.S. Cl. .................. 209/672; 209/667; 209/671; 209/672; 209/673
(58) Field of Search ................... 209/667, 671, 209/672–673

(56) References Cited

U.S. PATENT DOCUMENTS

| | | |
|---|---|---|
| 1,524,360 | 1/1925 | Lauritzen . |
| 2,670,846 * | 3/1954 | Rienks et al. .................... 209/671 |
| 4,972,960 | 11/1990 | Bielagus . |
| 5,425,459 * | 6/1995 | Ellis .................................. 209/671 |

FOREIGN PATENT DOCUMENTS

| | | | |
|---|---|---|---|
| 511963 | 6/1952 | (BE) . | |
| 2 145 612A * | 4/1985 | (GB) . | |
| 608375 * | 1/1995 | (GR) | ........................ 1/22 |
| 97/38568 | 10/1997 | (WO) . | |

* cited by examiner

Primary Examiner—Donald P. Walsh
Assistant Examiner—Joseph C. Rodriguez
(74) Attorney, Agent, or Firm—Ostrolenk, Faber, Gerb & Soffen, LLP

(57) ABSTRACT

An agricultural separating device has a starshaft (7) comprising a row of resilient starwheels (2) mounted on a rotatable shaft. Rings (5) formed of a rigid material (e.g. nylon or polypropylenes), and having an outer diameter such that they extend radially along 40–80% of the radial length of the fingers (4) of the starwheels (2), are mounted between adjacent starwheels (2) so as to close off the radially inner space between the fingers (4) without reducing the length and therefore flexibility of the fingers (4).

13 Claims, 2 Drawing Sheets

AGRICULTURAL SEPARATING DEVICE AND AGRICULTURAL SEPARATOR

BACKGROUND OF THE INVENTION

The present invention relates to an agricultural separating device and an agricultural separator including such a device.

It is well-known in the agricultural field to use starwheels when separating materials, eg clod and/or stones from root vegetables or bulbs, eg during harvesting, in de-stoning machines and also in static cleaning or grading equipment. Starwheels have a plurality of resiliently deformable "fingers" arranged around a central hub or boss and are at present formed from polyurethane or rubber, but could be formed from any other suitable material. In use, a plurality of starwheels are mounted on a rotatable shaft, commonly known as a "starshaft".

During use, damp soil may stick to the starwheels, or hard material, eg stones, may become jammed between the starwheels. This will reduce separation and produce wear of the starwheels.

GB 2 145 612 discloses two parallel starshafts arranged upstream of a counter rotating clod roller for use in separating clod and/or stones from root vegetables or bulbs. In practice, the fingers of the starwheels of adjacent starshafts are staggered and fit into the gaps between the starwheels of the adjacent starshaft. In such a position, the starshafts are said to be "interleaved". When separating potatoes, potato haulm can become wrapped around the starshafts, and interleaving the starshafts provides a degree of self-cleaning.

It is also known from EP 0 410 808 to arrange starshafts in a lifting conveyor. Although the starwheels may be interleaved, it is particularly advantageous in a de-stoning machine for there to be a radial gap between the ends of the fingers of the starwheels of adjacent starshafts, ie the starwheels of adjacent starshafts are not interleaved. There is, therefore, no self-cleaning of the starshafts.

SUMMARY OF THE INVENTION

An object of the present invention is to provide starshafts in which build up of material is reduced and, in certain applications, self-cleaning is facilitated.

The invention provides an agricultural separating device having a starshaft comprising a row of resilient starwheels mounted on a rotatable shaft, wherein rings formed of a rigid material, and having an outer diameter such that they extend radially along 40–80% of the radial length of the fingers of the starwheels, are mounted between adjacent starwheels so as to close off the radially inner space between the fingers without reducing the length and therefore flexibility of the fingers.

By in effect enlarging the boss diameter, the area between starwheels into which separated material (soil, small stones and plant material) can be lodged is reduced, thereby reducing the build up of material, and also allowing self-cleaning with a lesser degree of interleaving of the starwheels.

The agricultural separating device may be used in any agricultural separator, eg in a stone and/or clod separator, in a machine for separating soil and clod from root vegetables or bulbs, in a harvester and also in static cleaning equipment.

The invention also provides an agricultural separator including an agricultural separating device according to the invention. Preferably, the agricultural separator includes at least two agricultural separating devices according to the invention, wherein the starshafts are arranged adjacent and parallel to each other. Preferably, a clod roller is arranged adjacent and parallel to the downstream starshaft in the direction of movement, in use, of material being separated.

In a preferred embodiment, the clod roller and the downstream starshaft are movable as a unit relative to the adjacent upstream starshaft so as to vary the degree of interleaving between the starwheels of the said upstream and the downstream starshafts or to create or vary a radial spacing between the tips of the fingers of the starwheels of the said upstream and downstream starshafts.

Such a separator allows adjustment between a first position in which the starwheels are interleaved for self-cleaning, eg during separation of soil and clod from potatoes, and a second position in which the starwheels of adjacent starshafts are not interleaved, eg during harvesting carrots, or in a destoner, or when used merely as a separating conveyor.

The invention will be further described with reference to embodiments shown in the accompanying drawings, wherein:

PREFERRED EMBODIMENT OF THE INVENTION

Figure 1:
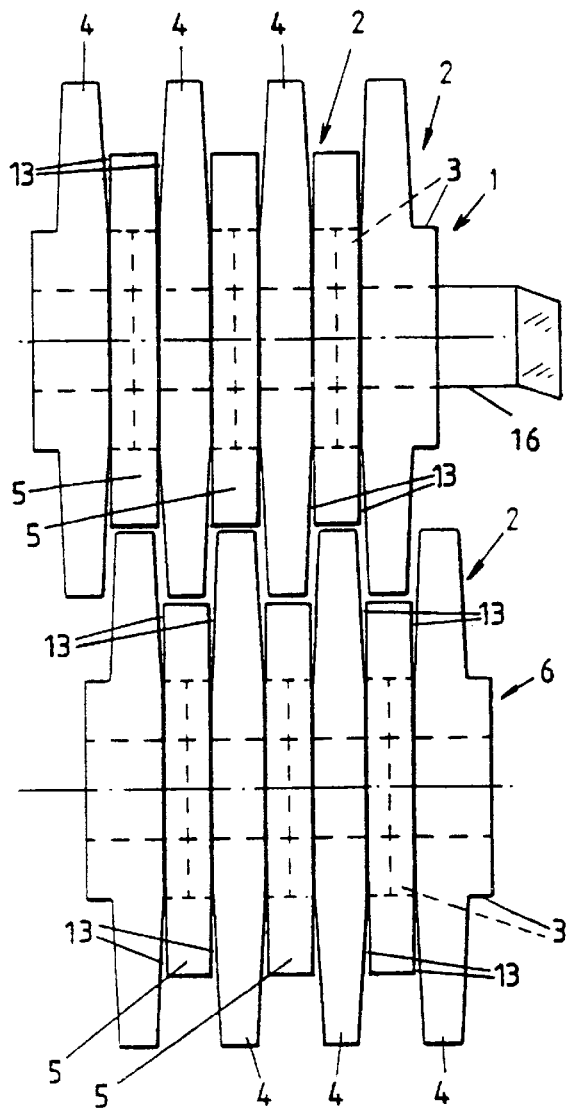
FIG. 1 shows in plan view parts of two interleaving starshafts of an agricultural separator.
Figure 3:
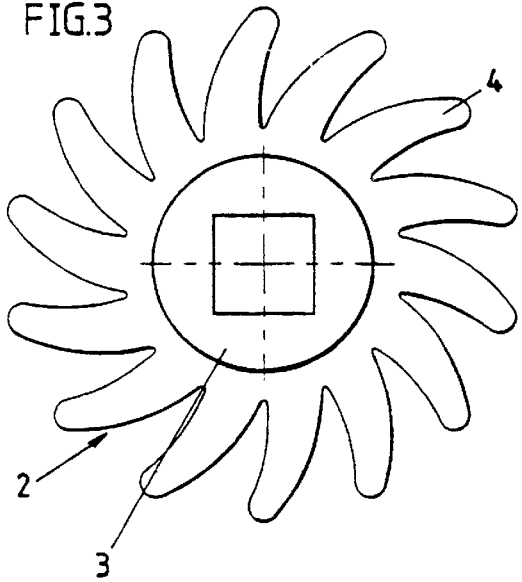
FIG. 3 shows in side view a starwheel of the separator of FIG. 1.

In FIG. 1, a first starshaft 1 comprises a plurality of starwheels 2 mounted on a shaft 16. Each starwheels 2 has a boss 3 and a plurality of curved, radially-extending resilient fingers 4, as can be seen also from FIG. 3. The starwheels are preferably formed from polyurethane or rubber with a resilience, depending on the particular use, but could be formed from any other suitable material.

As can be seen from FIG. 1, the sides of the bosses 3 of adjacent starwheels 2 abut each other and form a spacer between the fingers of adjacent starwheels.

Rings 5 of rigid material are mounted on the bosses 3 between adjacent starwheels 2 so as to extend radially along 40–80% of the radial length of the fingers. Preferably, the rigid rings 5 extend approximately 50% along the fingers as shown in FIG. 1. The rigid rings 5 are preferably made of plastics material, eg nylon or polypropylene, but any other suitable rigid material could be used.

There is a clearance play between the inner diameter of the rings 5 and the bosses 3 to facilitate fitting of the ring, although this is not essential.

As can be seen from FIG. 1 the sides of the fingers 4 of the starwheel 2 taper inwardly away from the rings 5 in a radially outward direction, so as to provide a gap 13 between each ring 5 and the adjacent fingers 4; the gap 13 increases in a radially outward direction. This allows lateral flexing of the fingers 4 when a stone is drawn down between the starwheels. However, the rings 5 would still function reasonably well if the gaps 13 were absent, ie if the sides of the fingers 4 were parallel.

As can be also seen from FIG. 1, a second starshaft 6 is arranged parallel to and adjacent the starshaft 1. The starwheels of the starshafts 1 and 6 are staggered so that the fingers 4 of the starwheels 2 of one starshaft enter the gaps between the starwheels 2 of the adjacent starshaft. The starwheels of adjacent shafts 1 and 6 are said to be "interleaved".

Figure 2:
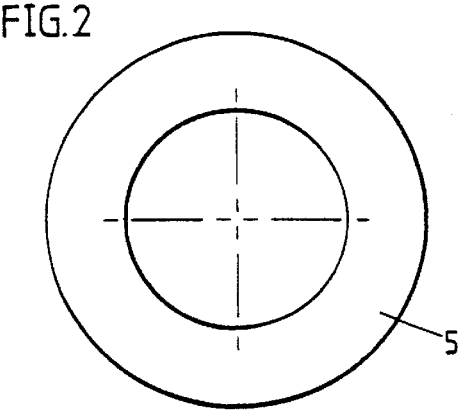
FIG. 2 shows in side view a ring of the separator of FIG. 1.

As already explained, the rigid rings 5 shown in FIGS. 1 and 2 may be mounted on starshafts incorporated in an agricultural separator, eg in a root-crop harvester (eg a potato harvester), a de-stoning machine, or in static cleaning or grading apparatus.

Figure 4:
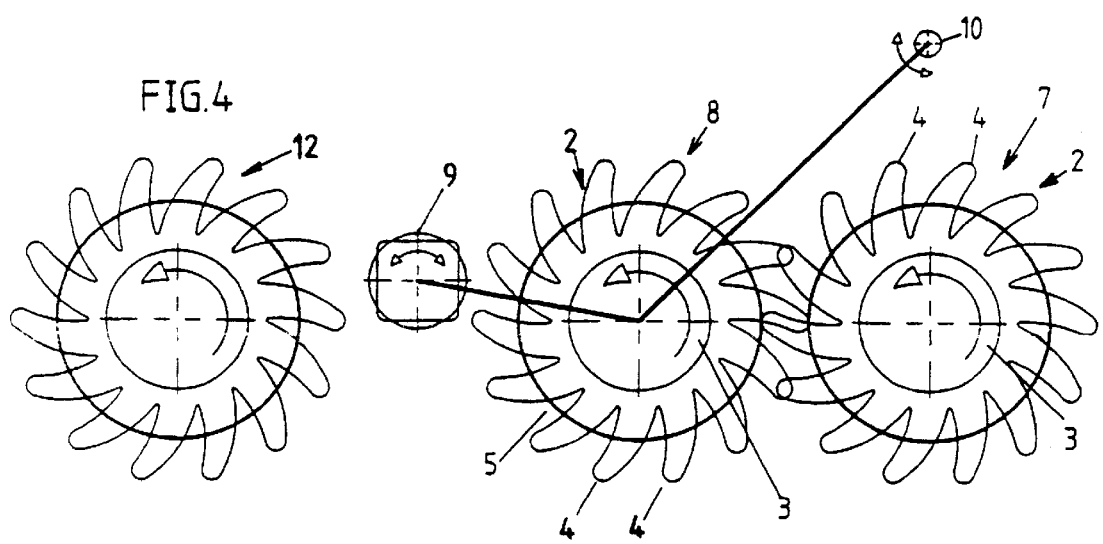
FIG. 4 shows diagrammatically in side view an agricultural separator in which one of the starshafts and the clod roller are movable together as a unit relative to an interleaved starshaft.
Figure 5:
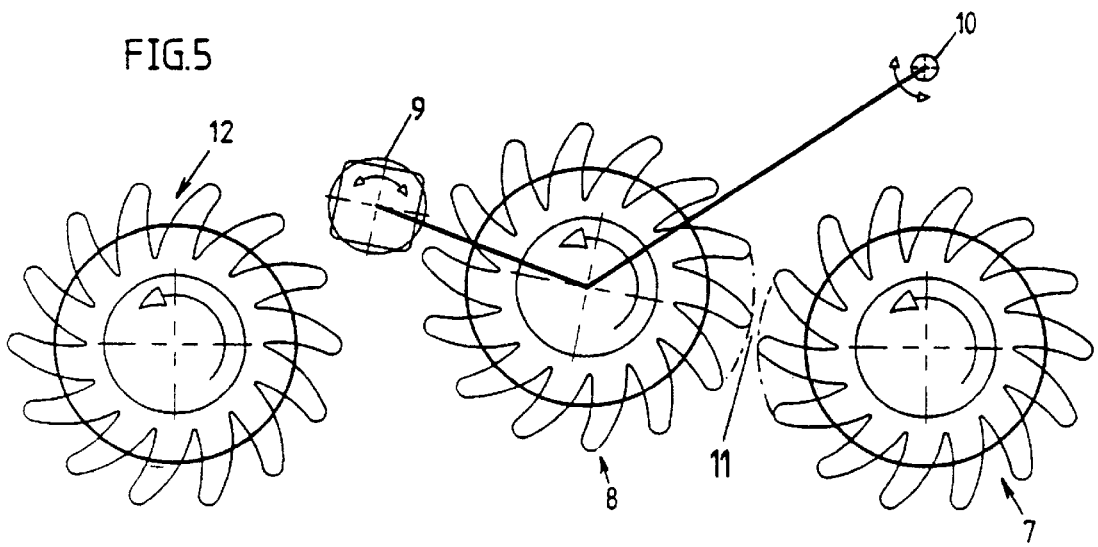
FIG. 5 shows diagrammatically in side view the separator of FIG. 4 in which the starwheels of the starshafts have been separated.

In FIGS. 4 and 5 an agricultural separator is shown having a pair of adjacent, parallel starshafts 7, 8 arranged upstream of a parallel clod roller 9, which may be arranged to rotate in the same direction as the starshafts 7, 8 (eg when harvesting carrots) or in the opposite direction (eg when harvesting potatoes).

The starshafts 7, 8 shown in FIGS. 4 and 5 are similar to the starshafts 1, 6 shown in FIG. 1, ie they each have a plurality of starwheels 2 having bosses 3 and resilient fingers 4. They also have rigid rings 5 arranged on the bosses 3 between adjacent starwheels.

The downstream starshafts 8 and the clod roller 9 are mounted in the separator as a unit, which is pivotable as a unit about an axis 10 to enable the starshaft 8 to be moved away from the starshaft 7 to alter the degree of interleaving therewith. As can be seen from FIG. 5, the pivoting movement may be such as to remove the interleaving altogether, so that there is a radial gap 11 between the tips of the fingers 4 of the starwheels 2 of the starshafts 7 and 8, eg when separating carrots; the pivoting movement may be used to adjust this gap depending on the material being separated.

Thus, the separator shown in FIGS. 4 and 5 may be used for separating both carrots and potatoes. When separating potatoes the starwheels are interleaved as shown in FIG. 4, whereas when separating carrots the starwheels are separated as shown in FIG. 5.

Alternatively, the separator shown in FIGS. 4 and 5 could be operated as shown in FIG. 5, and moved into the interleaving position of FIG. 4 merely for self-cleaning between periods of operation.

An advantage of the separator as shown in FIGS. 4 and 5 is that the starshafts 7, 8 can be moved apart without altering the overall length of a separating conveyor.

When the separator as shown in FIG. 4 is used for harvesting potatoes, the counter-rotating clod roller 9 tends to force potato haulm into the gaps between the starwheels 2 of the starshaft 8. Interleaving of the starwheels 4 of the starshafts 7 and 8 is necessary to remove this haulm. Furthermore, with the rigid rings 5 arranged on the starshafts 7, 8 between the starwheels 4, the degree of interleaving required to produce self-cleaning is substantially less than without the rings 5.

The group of the starshafts 7, 8 and clod roller 9 as shown in FIGS. 4 and 5 may be arranged in series with one or more similar groups to form a separating surface in which the downstream starshaft and clod roller of each group are pivotable as a unit relative to the respective upstream starshaft. Thus, in FIGS. 4 and 5 the starshaft 12 shown on the left of each Figure could be the upstream starshaft of a further group comprising two starshafts and a clod roller.

What is claimed is:

1. An agricultural separating device having a starshaft comprising a row of resilient starwheels mounted on a rotatable shaft and having radially-extending, flexible fingers, and rings mounted between adjacent starwheels, said rings being formed of a rigid material and having an outer diameter that is spaced radially outward from the shaft over 40–80% of the radial length of the fingers of the starwheels outward from the shaft without the rings engaging the fingers over the 40–80% of the radial length in a manner which might interfere with the flexing of the fingers so as to close off the radially inner space between the fingers without reducing the length and therefore without reducing flexibility of the fingers.

2. An agricultural separating device as claimed in claim 1, wherein the starwheels have bosses that extend along the shaft and the rings are mounted on the bosses of adjacent starwheels with clearance play between the rings and the bosses to facilitate mounting of the rings on the bosses.

3. An agricultural separating device as claimed in claim 1, wherein the fingers have sides and the rings have radially outward ends, and there is a gap between the sides of the fingers and the ends of the rings to facilitate lateral flexing of the fingers.

4. An agricultural separating device as claimed in claim 1, wherein the rings are formed of a rigid plastics material.

5. An agricultural separating device as claimed in claim 4, wherein the rigid plastics material is nylon or polypropylene.

6. An agricultural separator including an agricultural separating device as claimed in claim 1.

7. An agricultural separator including at least two of the agricultural separating devices as claimed in claim 1, wherein the respective starshafts of the devices are arranged adjacent, offset radially and parallel to each other.

8. An agricultural separator as claimed in claim 7, wherein the starwheels of the starshafts are staggered along the direction of extension of the starshafts, so that the tips of the starwheels of the adjacent starshafts interleave with the tips of the starwheels of each of the starshafts extending radially in past two of the starwheels of the other starshaft and toward the rings on the other starshaft.

9. An agricultural separator as claimed in claim 7, wherein the starwheels of the starshafts are staggered along the direction of extension of the starshafts, so that the tips of the starwheels of the starshafts are spaced in a radial direction.

10. An agricultural separator as claimed in claim 7, further comprising a clod roller arranged adjacent and parallel to the downstream one of the starshafts in the direction of movement, in use, of material being separated.

11. An agricultural separator as claimed in claim 10, wherein the clod roller and as of the downstream one of the starshafts are movable as a unit relative to the adjacent upstream starshaft so as to vary the degree of interleaving between the starwheels of the upstream and the downstream starshafts or to create or vary a radial spacing between the tips of the fingers of the starwheels of the upstream and downstream starshafts.

12. An agricultural separator as claimed in claim 11, wherein the clod roller and the downstream starshaft are pivotally movable relative to the upstream starshaft.

13. An agricultural separator as claimed in claim 12, wherein the clod roller and the downstream starshaft are pivotally movable about an axis above and upstream of the downstream starshaft.

* * * * *